US012627666B2

(12) United States Patent
Kim

(10) Patent No.: US 12,627,666 B2
(45) Date of Patent: May 12, 2026

(54) CONTROLLER-BASED NETWORK ACCESS CONTROL SYSTEM, AND METHOD THEREFOR

(71) Applicant: PRIBIT Technology, Inc., Seoul (KR)

(72) Inventor: Young Rang Kim, Seoul (KR)

(73) Assignee: PRIBIT TECHNOLOGY, INC., Seoul (KR)

( * ) Notice: Subject to any disclaimer, the term of this patent is extended or adjusted under 35 U.S.C. 154(b) by 57 days.

(21) Appl. No.: 18/710,527

(22) PCT Filed: Nov. 10, 2022

(86) PCT No.: PCT/KR2022/017611
§ 371 (c)(1),
(2) Date: May 15, 2024

(87) PCT Pub. No.: WO2023/090756
PCT Pub. Date: May 25, 2023

(65) Prior Publication Data
US 2025/0039177 A1     Jan. 30, 2025

(30) Foreign Application Priority Data

Nov. 18, 2021     (KR) ........................ 10-2021-0159715

(51) Int. Cl.
*H04L 9/40*         (2022.01)
(52) U.S. Cl.
CPC ............ *H04L 63/10* (2013.01); *H04L 63/101* (2013.01); *H04L 63/108* (2013.01); *H04L 63/1416* (2013.01)

(58) Field of Classification Search
CPC ..... H04L 63/10; H04L 63/101; H04L 63/102; H04L 63/104; H04L 63/105;
(Continued)

(56) References Cited

U.S. PATENT DOCUMENTS 8,327,128 B1* 12/2012 Prince ................. H04L 63/0884
                                                           713/153
10,924,503 B1* 2/2021 Pereira .................... H04L 63/20
(Continued)

FOREIGN PATENT DOCUMENTS

CN        117768134 A  *  3/2024
KR    10-2006-0130811 A    12/2006
(Continued)

*Primary Examiner* — Khanh Q Dinh
(74) *Attorney, Agent, or Firm* — SEED INTELLECTUAL PROPERTY LAW GROUP LLP

(57)                    ABSTRACT

A node according to an embodiment disclosed in the present document may store instructions which cause the node to: detect a network access event through an access control application; transmit a domain name system (DNS) query request packet to a first external server through the access control application; receive a DNS query result from the first external server, wherein the DNS query result includes domain information and IP information; and transmit a domain validation request or a network access request including the domain information to a second external server on the basis of whether a data flow corresponding to the IP information exists, through the access control application.

14 Claims, 13 Drawing Sheets

(58) Field of Classification Search
CPC ... H04L 63/107; H04L 63/123; H04L 63/126;
H04L 63/108; H04L 63/1416; H04L
63/1433
USPC .......................................... 709/220, 224–228
See application file for complete search history.

(56) References Cited

U.S. PATENT DOCUMENTS

| | | | | |
|---|---|---|---|---|
| 11,245,722 B1* | 2/2022 | Senecal | ............... | H04L 63/1466 |
| 11,368,483 B1* | 6/2022 | Senecal | ............... | H04L 63/1466 |
| 11,374,945 B1* | 6/2022 | Senecal | ............... | H04L 63/1416 |
| 2009/0204815 A1* | 8/2009 | Dennis | ................ | H04W 12/126 |
| | | | | 713/168 |
| 2009/0240941 A1 | 9/2009 | Lee et al. | | |
| 2010/0100629 A1 | 4/2010 | Raciborski et al. | | |
| 2010/0318681 A1* | 12/2010 | Shi | ...................... | H04L 63/1483 |
| | | | | 709/245 |
| 2014/0032589 A1* | 1/2014 | Styler | ................... | H04L 63/126 |
| | | | | 707/767 |
| 2014/0373097 A1* | 12/2014 | Thayer | ............... | H04L 63/1441 |
| | | | | 726/4 |
| 2014/0373127 A1* | 12/2014 | Thayer | ................. | H04L 63/168 |
| | | | | 726/10 |
| 2015/0211313 A1* | 7/2015 | Parfitt | ..................... | E21B 10/02 |
| | | | | 175/44 |
| 2016/0105417 A1* | 4/2016 | Lee | ........................ | H04L 67/306 |
| | | | | 726/7 |
| 2021/0091976 A1 | 3/2021 | Kim et al. | | |
| 2021/0092094 A1 | 3/2021 | Kim et al. | | |
| 2021/0092095 A1 | 3/2021 | Kim et al. | | |
| 2021/0328830 A1* | 10/2021 | Kim | ........................ | H04L 63/10 |
| 2022/0247718 A1 | 8/2022 | Kim et al. | | |
| 2022/0247719 A1* | 8/2022 | Kim | ................... | H04L 12/4633 |
| 2022/0247720 A1* | 8/2022 | Kim | ................... | H04L 12/4633 |
| 2022/0247721 A1 | 8/2022 | Kim | | |
| 2022/0247748 A1 | 8/2022 | Kim | | |
| 2022/0255906 A1 | 8/2022 | Kim et al. | | |
| 2022/0337604 A1 | 10/2022 | Kim et al. | | |
| 2023/0370492 A1* | 11/2023 | Duan | .................. | H04L 63/1416 |

FOREIGN PATENT DOCUMENTS

| | | | | | |
|---|---|---|---|---|---|
| KR | 10-2008-0001574 A | 1/2008 | | | |
| KR | 10-1622876 B1 | 5/2016 | | | |
| KR | 10-2137773 B1 | 7/2020 | | | |
| KR | 102449139 B1 * | 9/2022 | ......... | H04L 63/0272 | |
| KR | 102460692 B1 * | 10/2022 | .............. | H04L 9/40 | |

\* cited by examiner

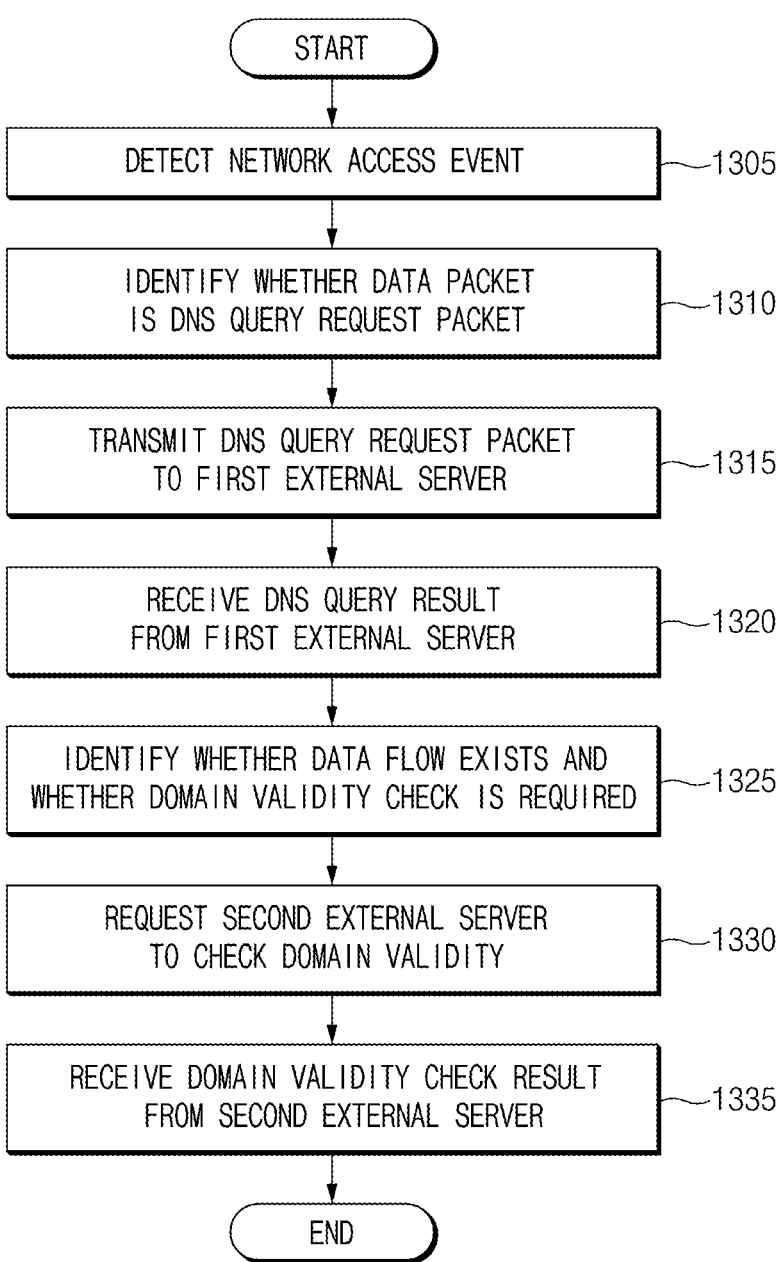

START

DETECT NETWORK ACCESS EVENT ~1305

IDENTIFY WHETHER DATA PACKET
IS DNS QUERY REQUEST PACKET ~1310

TRANSMIT DNS QUERY REQUEST PACKET
TO FIRST EXTERNAL SERVER ~1315

RECEIVE DNS QUERY RESULT
FROM FIRST EXTERNAL SERVER ~1320

IDENTIFY WHETHER DATA FLOW EXISTS AND
WHETHER DOMAIN VALIDITY CHECK IS REQUIRED ~1325

REQUEST SECOND EXTERNAL SERVER
TO CHECK DOMAIN VALIDITY ~1330

RECEIVE DOMAIN VALIDITY CHECK RESULT
FROM SECOND EXTERNAL SERVER ~1335

END

FIG.13

CONTROLLER-BASED NETWORK ACCESS CONTROL SYSTEM, AND METHOD THEREFOR

CROSS-REFERENCE TO RELATED APPLICATION(S)

The present disclosure claims the benefit of Korean Patent Application No. 10-2021-0159715 filed on Nov. 18, 2021 with the Korean Intellectual Property Office, the disclosure of which is incorporated herein by reference in its entirety.

BACKGROUND

Technical Field

Embodiments of the present disclosure relate to a system for controlling a network access based on a controller and a method thereof.

Description of the Related Art

A plurality of devices may communicate data over a network. For example, a smartphone may transmit or receive data to or from a server over the Internet. The network may include a private network such as an intranet as well as a public network such as the Internet.

BRIEF SUMMARY

Technical Problem

A technology for restricting the access to the network based on transmission control protocol (TCP)/Internet protocol (IP) is being applied to control the indiscriminate access to the network.

For example, when an authorized terminal is provided with an authorized IP address, a network access controller (NAC) allows the authorized terminal to access the network; when an unauthorized terminal uses an unauthorized IP address, the NAC blocks the unauthorized terminal by using address resolution protocol spoofing (ARP spoofing). A firewall refers to a method of determining whether to permit the transmission of a data packet, based on a source IP, a destination IP, and port information, which are included in IP header information, and a policy. A virtual private network (VPN) refers to a method which guarantees the integrity and confidentiality of data packets by using a tunnel, to which encryption is applied, on the TCP/IP protocol.

However, the ARP spoofing may act as a load on the network. Nowadays, a technology for bypassing the ARP spoofing is being developed. Because the firewall is used to control the flow of data packets, the firewall may fail to directly involve the process of generating a connection between two nodes. Also, the VPN is vulnerable to management associated with the flow of data packets after the tunnel is generated. In addition, because the above technologies are based on the TCP/IP, the above technologies may be vulnerable to security associated with any other layer (e.g., an application layer) among open system interconnection (OSI) layers.

Various embodiments of the present disclosure provide a system for addressing the above-mentioned problems in a network environment and a method thereof.

Technical Solution

A node according to an embodiment of the present disclosure may include a communication circuit, a processor that is operatively connected to the communication circuit, and a memory that is operatively connected to the processor and stores a database, a target application, and an access control application. The memory stores instructions causing, when executed by the processor, the node to detect a network access event through the access control application, to transmit a domain name system (DNS) query request packet to a first external server through the access control application, to receive a DNS query result from the first external server, the DNS query result including domain information and IP information, and to perform a domain validity check request or a network access request including the domain information to a second external server based on whether there exists a data flow corresponding to the IP information, through the access control application.

A server according to an embodiment of the present disclosure may include a communication circuit, a memory that stores a database, and a processor that is operatively connected to the communication circuit and the memory. The processor may receive a network access request for a destination network of a target application from an access control application of a node, may identify whether an access of the target application is possible, based on identification information and domain information of the target application, and identification information and a port of the destination network, may identify whether there exists a data flow corresponding to the identification information of the target application, the identification information of the destination network, a port, and the domain information, may perform a domain validity check based on the identification information of the destination network, a port, and the domain information, and may transmit whether a network access is possible to the access control application based on whether the data flow exists and a result of the domain validity check.

An operating method of an access control application stored in a node, according to an embodiment of the present disclosure, may include detecting a network access event, identifying whether a data packet of a target application is a DNS query request packet, transmitting the DNS query request packet to a first external server, receiving a DNS query result from the first external server, wherein the DNS query result includes domain information and IP information, identifying whether a data flow corresponding to the IP information exists and whether there is a need to check domain validity of the data flow, requesting a domain validity check to a second external server, the domain validity check request including identification information of the data flow, the domain information, and the IP information, and receiving a domain validity check result including a data flow whose a domain validity check state is updated from the second external server.

Advantageous Effects

According to embodiments of the present disclosure, a node may block a data packet from being received from an unauthorized application.

Also, according to embodiments of the present disclosure, it is possible to solve the problem of setting and retrieving a policy and to prevent bypass attacks, compared to a wide range of IP address-based network security technologies such as an NAC.

Moreover, according to embodiments of the present disclosure, it is possible to block a man-in-the-middle (MITM) attack in a zero trust network environment, and thus tunnel-based access control may be performed compared to VPN that provides only section protection.

In addition, according to embodiments of the present disclosure, it is possible to solve an issue inherent in a TCP/IP-based network security technology and to provide a safe network connection.

Besides, according to embodiments of the present disclosure, it is possible to solve an issue that there is a need to set a policy depending on network control equipment.

Also, according to embodiments of the present disclosure, an access to any other network other than a network connected through a gateway may be controlled.

Moreover, according to embodiments of the present disclosure, it may be possible to prevent DNS pharming threats by the use of an untrusted domain name system (DNS) over an always-connected Internet or various rogue APs and man-in-the-middle (MITM) attacks present in a network section, Malware infection through the access to a harmful site or an unauthorized site, which is made by using an unauthorized application or an unsafe application, and leakage of data downloaded from a business network.

In addition, according to embodiments of the present disclosure, it may be possible to provide a structure which detects whether the access by a DNS query untrusted at a node is normal, based on a DNS table and a query structure with a trusted DNS, permits the access only in a normal case, and permits the access only when a network access is not harmful in conjunction with a harmful site database or a harmful site system.

Besides, according to embodiments of the present disclosure, a problem of bypassing a DNS pharming detection technology in the form of proxy may be solved through a structure which makes an access of an application and a destination network not authorized by a controller impossible and makes it possible to identify DNS information through a controller which receives DNS packet information of a node and is connected to a trusted DNS.

Also, according to embodiments of the present disclosure, policy setting and management may be easy by making it possible to set a policy in the form of domain information as well as IP-based policy setting.

In addition, various effects ascertained directly or indirectly through the present disclosure may be provided.

BRIEF DESCRIPTION OF THE SEVERAL VIEWS OF THE DRAWINGS

FIG. 13 is a flowchart illustrating operations for querying a DNS in a network access on a node, according to various embodiments.

With regard to description of drawings, the same or similar components will be marked by the same or similar reference numerals/signs.

DETAILED DESCRIPTION

Figure 1:
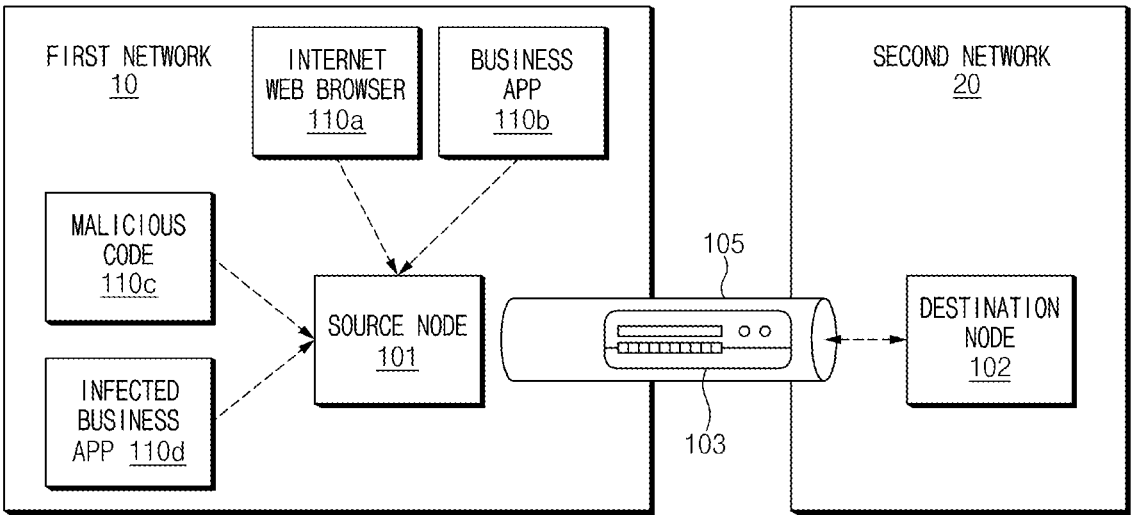
FIG. 1 illustrates an environment including a plurality of networks.

Hereinafter, various embodiments of the disclosure will be described with reference to accompanying drawings. However, it should be understood that this is not intended to limit the present disclosure to specific implementation forms and includes various modifications, equivalents, and/or alternatives of embodiments of the present disclosure.

In the specification, the singular form of the noun corresponding to an item may include one or more of items, unless interpreted otherwise in context. In the specification, each of phrases such as "A or B", "at least one of A and B", "at least one of A or B", "A, B, or C", "at least one of A, B, and C", and "at least one of A, B, or C" may include any one of items listed together with a relevant phase among the phases or all possible combinations thereof. The terms such as "first" or "second" may be used to simply distinguish the corresponding component from the other component but do not limit the corresponding components in other aspects (e.g., importance or order). When a component (e.g., a first component) is referred to as being "coupled to" or "connected to" another component (e.g., a second component) with or without the term of "operatively" or "communicatively", it may mean that the first component is capable of being connected to the second component, directly (e.g., by wire), wirelessly, or through a third component.

Each component (e.g., a module or a program) of components described in the specification may include a single entity or a plurality of entities. According to various embodiments, one or more components of corresponding components or operations may be omitted, or one or more other components or operations may be added. Alternatively or additionally, a plurality of components (e.g., a module or a program) may be integrated into one component. In this case, the integrated component may perform one or more functions of each component of the plurality of components to be the same as or similar to those performed by the corresponding component of the plurality of components before the plurality of components are integrated. According to various embodiments, operations which are performed by modules, programs, or other components may be performed by a sequential, parallel, repeated, or heuristic method; alternatively, one or more of the operations may be performed in another order or may be omitted, or one or more operations may be added thereto.

As used in the present disclosure, the term "module" may include a unit implemented in hardware, software, or firmware and may be interchangeably used, for example, with terms such as "logic", "logic block", "part", or "circuit". The module may be a minimum unit of an integrated part or may be a minimum unit of the part for performing one or more functions or a part thereof. For example, according to an embodiment, the module may be implemented in the form of an application-specific integrated circuit (ASIC).

Various embodiments of the present disclosure may be implemented as software (e.g., a program or an application) including one or more instructions stored in a storage medium (e.g., a memory) readable by a machine. For example, a processor of the machine may call at least one instruction among the stored one or more instructions from the storage medium and then may execute the at least one instruction. This enables the machine to operate such that at least one function is executed depending on the called at least one instruction. The one or more instructions may include a code generated by a complier or a code executable by an interpreter. The machine-readable storage medium may be provided in the form of a non-transitory storage medium. Herein, the "non-transitory" only means that the storage medium is a tangible device and does not include a signal (e.g., an electromagnetic wave), and this term does not distinguish the case where data are semipermanently stored in the storage medium from the case where the data are stored temporarily.

A method according to various embodiments disclosed in the specification may be provided to be included in a computer program product. The computer program product may be traded between a seller and a buyer as a product. The computer program product may be distributed in the form of a machine-readable storage medium (e.g., a compact disc read only memory (CD-ROM)) or may be distributed (e.g., downloaded or uploaded), through an application store, directly between two user devices, or online. If distributed online, at least a part of the computer program product may be temporarily generated or may be at least temporarily stored in the machine-readable storage medium such as a memory of the manufacturer's server, a server of the application store, or a relay server.

FIG. 1 illustrates an environment including a plurality of networks.

Referring to FIG. 1, a first network 10 and a second network 20 may be different networks. For example, the first network 10 may be a public network such as the Internet, and the second network 20 may be a private network such as an intranet or a virtual private network (VPN).

The first network 10 may include a source node 101. In FIG. 1 and embodiments to be described below, the "source node" may be various types of devices capable of performing data communication. For example, the source node 101 may include a portable device such as a smartphone and a tablet, a computer device such as a desktop or a laptop, a multimedia device, a medical device, a camera, a wearable device, a virtual reality (VR) device, or a home appliance but are not limited to the above devices. For example, the source node 101 may include a server or a gateway capable of transmitting a data packet through an application. The source node 101 may be also referred to as an "electronic device" or a "terminal". Meanwhile, a destination node 102 may include a device which is the same as or similar to that of the source node 101 described above.

The source node 101 may attempt to access the second network 20 and may transmit data to the destination node 102 included in the second network 20. The source node 101 may transmit data to the destination node 102 through a gateway 103 and a tunnel 105.

When the access of the source node 101 to the first network 10 is granted, the source node 101 may be able to communicate with all servers included in the first network 10; in this case, the source node 101 may be exposed from an attack of a malicious program. For example, the source node 101 may receive a malicious code 110c or data of an untrusted or insecure application such as an infected business application 110d, as well as an Internet web browser 110a and a trusted and/or secure application such as a business application 110b.

The source node 101 infected from the malicious program may attempt to access the second network 20 and/or to transmit data to the second network 20. When the second network 20 is established based on an IP like the VPN, it may be difficult for the second network 20 to individually monitor a plurality of devices included in the second network 20, and the second network 20 may be vulnerable to security of an application layer or a transport layer in an OSI layer. Also, when the source node 101 includes a malicious application after the tunnel is already generated, data of the malicious application may be transmitted to any other electronic device (e.g., the destination node 102) in the second network 20.

Figure 2:
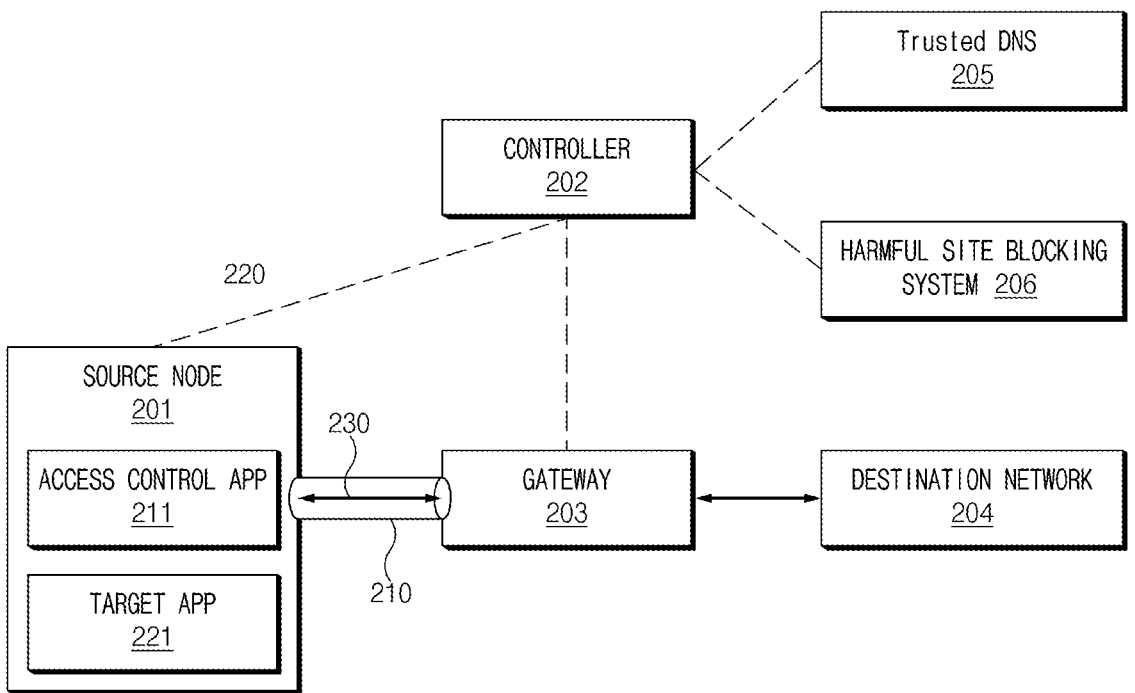
FIG. 2 illustrates an architecture in a network environment, according to various embodiments.

FIG. 2 illustrates an architecture in a network environment, according to various embodiments.

Referring to FIG. 2, the number of source nodes 201, the number of gateways 203, and the number of destination nodes 204 are not limited to those illustrated in FIG. 2. For example, the source node 201 may transmit data to a plurality of destination nodes through a plurality of gateways, and a controller 202 may manage a plurality of source nodes, a plurality of gateways, and a plurality of destination nodes. The source node 201 may perform a function which is the same as or similar to that of the source node 101 illustrated in FIG. 1, the gateway 203 may perform a function which is the same as or similar to that of the gateway 103 illustrated in FIG. 1, and the destination node 204 may perform a function which is the same as or similar to that of the destination node 102 illustrated in FIG. 1.

The controller 202 may be, for example, a server (or a cloud server). The controller 202 may manage data transmission between the source node 201, the gateway 203, and the destination node 204 and thus may guarantee trusted data transmission in the network environment. For example, the controller 202 may manage the access of the source node 201 to the destination node 204 through policy information or blacklist information, may arbitrate the generation of an authorized tunnel 210 between the source node 201 and the gateway 203, may communicate with a trusted DNS 205 to query the DNS, may communicate with a harmful site blocking system 206 to block the access to harmful sites, or may remove the tunnel 210 depending on a security event collected from the source node 201 or the gateway 203. The source node 201 may communicate with the destination node 204 only through the tunnel 210 authorized by the controller 202; when the authorized tunnel 210 does not exist, the source node 201 may block the access to the destination node 204. According to an embodiment, the controller 202 may exchange control data packets with the source node 201 to perform various operations (e.g., registration, approval, authentication, update, and termination) associated with the network access of the source node 201. A flow (e.g., 220) through which the control data packets are transmitted may be referred to as a "control flow".

The gateway 203 may be located at the boundary of a network to which the source node 201 belongs or at the boundary of a network to which the destination node 204 belongs. The gateway 203 may be provided in plurality. The gateway 203 may forward a data packet, which is received only through the authorized tunnel 210, from among data packets received from the source node 201 to the destination node 204. A flow (e.g., 230) through which a data packet is transmitted between the source node 201 and the gateway 203, between the gateway 203 and the destination node 204, or between the source node 201 and the destination node 204 may be referred to as a "data flow". Compared to the tunnel 210 generated in units of terminal or IP, the data flow may be generated in a more detailed unit (e.g., in units of application). According to an embodiment, the gateway 203 may be connected to the controller 202 based on a cloud. The gateway 203 may generate the authorized tunnel 210 with the source node 201 under control of the controller 202.

According to various embodiments, the source node 201 may include a network driver (not illustrated) and an access control application 211 for managing a network access of an application stored in the source node 201. For example, when the event that a target application 221 (e.g., an arbitrary one of the applications 110a to 110d of FIG. 1) included in the source node 201 accesses the destination node 204 occurs, the access control application 211 may determine whether the access of the target application 221 is possible. When the access of the target application 221 is possible, the access control application 211 may transmit a data packet to the gateway 203 through the tunnel 210. The access control application 211 may control the transmission of the data packet through a network driver and a kernel including an operating system within the source node 201.

Figure 3:
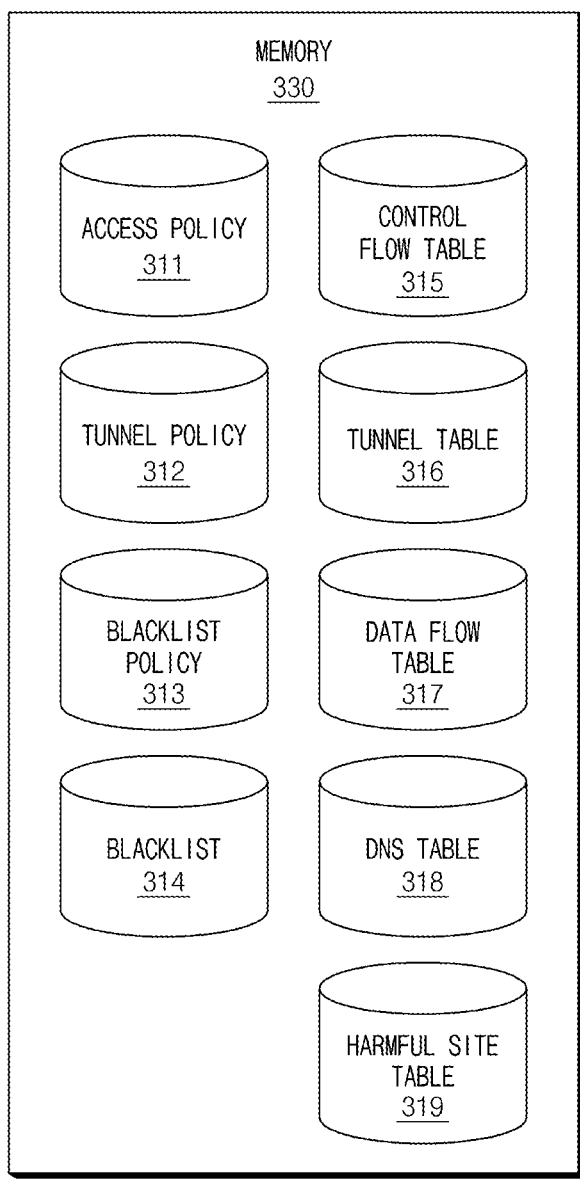
FIG. 3 is a functional block diagram illustrating a database stored in a controller, according to various embodiments.

FIG. 3 is a functional block diagram illustrating a database stored in a controller (e.g., the controller 202 of FIG. 2) according to various embodiments. FIG. 3 shows only a memory 330. However, a controller may further include a communication circuit (e.g., a communication circuit 430 of FIG. 4) for communicating with an external electronic device (e.g., the source node 201, the gateway 203, or the destination node 204 of FIG. 2) and a processor (e.g., a processor 410 of FIG. 4) for controlling all the operations of the controller.

Referring to FIG. 3, the controller may store databases 311 to 319 for controlling a network access and data transmission in the memory 330.

The access policy database 311 may include information about a service and/or a network accessible by an identified network, source node, destination node, user, or application. For example, when a request for the access to the destination node is received from the source node, the controller may determine whether the identified network (e.g., a network to which the source node belongs), the source node, the user (e.g., a user of the source node), and/or the application (e.g., an application included in the source node) is capable of accessing the destination node, based on the access policy database 311. Also, the access policy database 311 may include information about whether there is a need to check the DNS, trusted DNS designation information for domain identification, information about whether there is a need to block a harmful site, information about a harmful site blocking database kind, and external harmful site blocking service and interworking information.

The tunnel policy database 312 may include an encryption method, encryption level information, and a type of a tunnel, which is to be connected to a source node (e.g., a terminal) and a gateway present at the boundary of a network on a connection path. For example, when the access to the destination node is requested from the source node, the controller may provide the source node with an optimal tunnel for accessing the destination node and information thereof based on the tunnel policy database 312.

The blacklist policy database 313 may include a policy for permanently or temporarily blocking the access of a specific node (e.g., a source node or a destination node). The blacklist policy database 313 may be generated based on information (e.g., at least one of a source node identifier (ID), an IP address, a media access control (MAC) address, or a user ID) identified through a risk level, an occurrence period, and/or a behavioral analysis of a security event among security events periodically collected from a source node, a destination node, or a gateway.

The blacklist database 314 may include a list of at least one of a source node, a destination node, an IP address, a MAC address, or a user blocked by the blacklist policy database 313. For example, when identification information of a source node requesting the access to the destination node is included in the blacklist database 314, the controller may isolate the source node from the destination node by denying the access request of the source node.

The control flow table 315 is an example of a session table for managing a flow (e.g., a control flow) of a control data packet generated between a node (e.g., a source node or a destination node) and the controller. When the access to the controller is successfully made, control flow information may be generated by the controller. The control flow information may include at least one of identification information of the control flow, an IP address identified when the access and authentication associated with the controller is performed, a node ID, or a user ID. For example, when the access to the destination node is requested from the source node, the controller may determine whether the access of the source node is possible and whether to a tunnel is generated, by searching for the control flow information through control flow identification information received from the source node and mapping at least one of an IP address, a source node ID, or a user ID included in the found control flow information to the access policy database 311. According to an embodiment, the control flow table 315 may include information about an authentication method, an authentication token, and an authentication target necessary when the execution of enhanced authentication is requested.

According to an embodiment, the control flow may include an expiration time. The node (e.g., a source node or a destination node) should update the expiration time of the control flow, and when the expiration time is not updated during a given time, the control flow (or the control flow information) may be removed. Also, when it is determined that there is a need to immediately block the access depending on the security event collected from the node or the gateway, the controller may remove the control flow depending on an access termination request of the node. When the control flow is removed, the tunnel and the data flow, which are previously generated, may be also removed, and thus, the access of the node may be blocked.

The tunnel table 316 is a table for managing a tunnel connected between the source node and the gateway. The tunnel may be generated, for example, in units of device or IP. When the tunnel is generated between the terminal and the gateway, the tunnel table 316 may include tunnel identification information, control flow identification information when the tunnel is dependent on the control flow, a tunnel end point (TEP), a tunnel start point (TSP), a tunnel algorithm, a tunnel type, and/or additional information for managing the tunnel.

The data flow table 317 is a table for managing a flow (e.g., a data flow) through which the detailed data packet is transmitted between the source node and the destination node. The data flow may be generated in units of TCP session, in units of source terminal application, or in a more detailed unit within the tunnel generated in units of source node or IP. The data flow table 317 may include data flow identification information, control flow identification information when the data flow is dependent on the control flow, an application ID for determining whether a data packet transmitted from the source node is an authorized data packet, a destination IP address, and/or a service port. Also, the data flow table 317 may include identification information of the tunnel in which a data flow is to be used. Furthermore, the data flow table 317 may include a header (or header information) for determining whether a data packet is valid. In addition, the data flow table 317 may further include whether a data flow header being authentication information is inserted into a data packet, a method of inserting a header, whether there is a need to authenticate a data flow, an authentication state, and/or an authentication expiration time. Also, the data flow table 317 may include source node information (e.g., a source IP), service port information, and receivable application information of the destination node. Furthermore, the data flow table 317 may include status information for rejecting an access when the corresponding data flow is detected as a harmful site or abnormal DNS and is not available, domain identification-required status information when a domain is not identified, and domain identification-completed status information when a domain is completely identified. In this case, the node or controller may block the access depending on the status information stored in the data flow table 317. Alternatively, when domain identification is required, the node or controller may request domain identification, and when the domain is identified, the node or controller may update domain information including domain name information matched with an IP so as to be included in the data flow.

The DNS table 318 may refer to a table for storing a domain name (or domain information) matched with an IP. The controller or node may preferentially search for an access-requested IP or domain name in the DNS table 318 based on the DNS table 318 and may identify whether the access-requested IP or domain name is normal. Also, when the controller or node is a domain name or IP absent from the DNS table 318, the controller or node may query a trusted DNS (e.g., the trusted DNS 205 of FIG. 2) connected to the controller and may identify whether the corresponding domain name is normal and IP information matched with the corresponding domain name. Accordingly, the controller or node may quickly identify whether the DNS is normal by searching for information stored in the DNS table 318, not by always querying an external DNS to identify a domain name and IP information.

The harmful site table 319 may refer to a list of IPs or domain names which should be blocked from accessing. When the access-requested IP or domain name is included in the harmful site table 319, the node or controller may block the access; when the access-requested IP or domain name is not included in the harmful site table 319, the node or controller may additionally identify whether to block the access-requested IP or domain name in conjunction with a harmful site blocking system (e.g., the harmful site blocking system 206 of FIG. 2) which is updated in real time.

The controller and the node according to various embodiments of the present disclosure may control the access to unsafe DNSs or harmful sites in association with any other network, which does not cooperate with the gateway, based on the DNS table 318 and the harmful site table 319.

Figure 4:
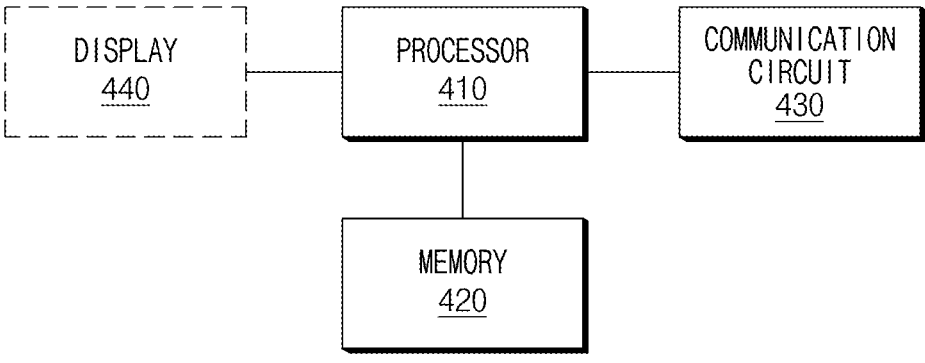
FIG. 4 is a functional block diagram of a node, according to various embodiments.

FIG. 4 illustrates a functional block diagram of a node (e.g., the source node 201 and the destination node 204 of FIG. 2) according to various embodiments.

Referring to FIG. 4, a node may include the processor 410, a memory 420, and the communication circuit 430.

According to an embodiment, the node may further include a display 440 to perform an interface with a user.

The processor 410 may control all the operations of the node. In various embodiments, the processor 410 may include a single processor core or may include a plurality of processor cores. For example, the processor 410 may include a multi-core such as a dual-core, a quad-core, a hexa-core, or the like. According to embodiments, the processor 410 may further include a cache memory located at the inside or outside thereof. According to embodiments, the processor 410 may be configured with one or more processors. For example, the processor 410 may include at least one of an application processor, a communication processor, or a graphical processing unit (GPU).

Part or all of the processor 410 may be electrically or operatively coupled with or connected to any other component (e.g., the memory 420, the communication circuit 430, or the display 440) in the node. The processor 410 may receive commands of any other components of the node, may interpret the received commands, and may perform calculation or data processing depending on the interpreted commands. The processor 410 may interpret and process a message, data, an instruction, or a signal received from the memory 420, the communication circuit 430, or the display 440. The processor 410 may generate a new message, data, instruction, or signal based on the received message, data, instruction, or signal. The processor 410 may provide the processed or generated message, data, instruction, or signal to the memory 420, the communication circuit 430, or the display 440.

The processor 410 may process data or a signal which is generated or caused by a program. For example, the processor 410 may request an instruction, data, or a signal from the memory 420 to execute or control the program. The processor 410 may record (or store) or update an instruction, data, or a signal at the memory 420 to execute or control the program.

The memory 420 may store an instruction to control the node, a control instruction code, control data, or user data. For example, the memory 420 may include at least one of an application program, an operating system (OS), middleware, or a device driver.

The memory 420 may include one or more of a volatile memory or a non-volatile memory. The volatile memory may include a dynamic random access memory (DRAM), a static RAM (SRAM), a synchronous DRAM (SDRAM), a phase-change RAM (PRAM), a magnetic RAM (MRAM), a resistive RAM (RRAM), a ferroelectric RAM (FeRAM), or the like. The non-volatile memory may include a read only memory (ROM), a programmable ROM (PROM), an electrically programmable ROM (EPROM), an electrically erasable programmable ROM (EEPROM), a flash memory, or the like.

The memory 420 may further include a non-volatile medium such as a hard disk drive (HDD), a solid state disk (SSD), an embedded multimedia card (eMMC), or universal flash storage (UFS).

According to an embodiment, the memory 420 may store a portion of information included in a memory (e.g., the memory 330 of FIG. 3) of the controller. For example, the memory 420 may store the tunnel table 316, the data flow table 317, the DNS table 318, and the harmful site table 319 which are described with reference to FIG. 3.

The communication circuit 430 may establish a wired or wireless communication connection between the node and an external electronic device (e.g., the controller 202 or the gateway 203 of FIG. 2) and may support to communicate through the established communication connection. According to an embodiment, the communication circuit 430 may include a wireless communication circuit (e.g., a cellular communication circuit, a short-range wireless communication circuit, or a global navigation satellite system (GNSS) communication circuit) or a wired communication module (e.g., a local area network (LAN) communication circuit or a power line communication circuit) and may communicate with the external electronic device by using a corresponding communication circuit among them through the short-range communication network such as a Bluetooth, a WiFi direct, or an infrared data association (IrDA)) or the long-distance communication network such as a cellular network, an Internet, or a computer network. The various communication circuits 430 described above may be implemented with one chip or may be respectively implemented with separate chips.

The display 440 may output content, data, or a signal. In various embodiments, the display 440 may display image data processed by the processor 410. According to embodiments, the display 440 may be coupled with a plurality of touch sensors (not illustrated) capable of receiving a touch input or the like so as to be configured with an integrated touch screen. When the display 440 is configured with the touch screen, the plurality of touch sensors may be disposed over the display 440 or may be disposed under the display 440.

Meanwhile, a server (e.g., the controller 202) according to an embodiment may include the processor 410, the memory 420, and the communication circuit 430. The processor 410, the memory 420, and the communication circuit 430 included in the server may be substantially the same as the processor 410, the memory 420, and the communication circuit 430 which are described above.

Figure 5:
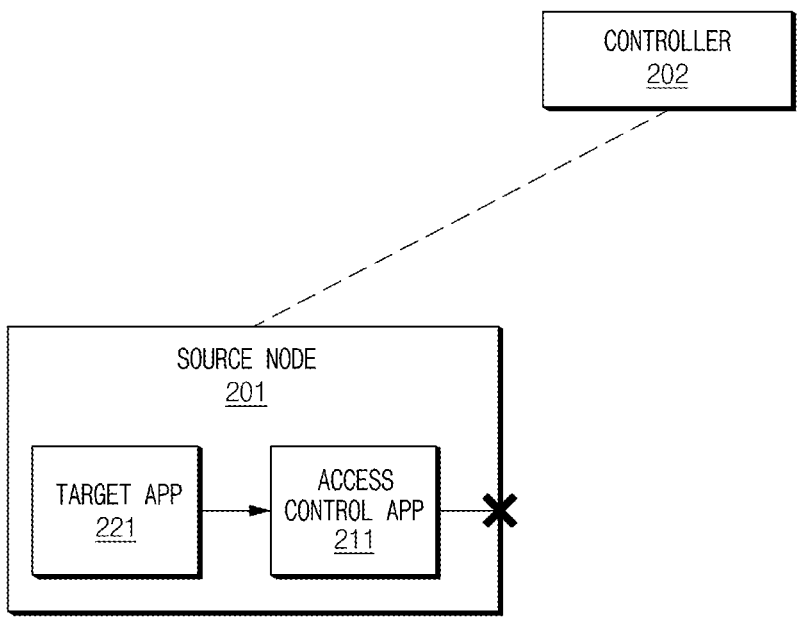
FIG. 5 describes an operation of controlling transmission of a data packet, according to various embodiments.

FIG. 5 describes an operation of controlling transmission of a data packet, according to various embodiments.

Referring to FIG. 5, the access control application 211 may detect a network access request for a destination network (e.g., the destination node 204) from the target application 221 included in the source node 201 and may determine whether the source node 201 or the target application 211 is in a state of connecting to the controller 202. When the source node 201 or the target application 221 is not in a state of connecting to the controller 202, the access control application 211 may block the transmission of a data packet at a kernel including an operating system or a network driver. Through the access control application 211, the source node 201 may in advance block the access of a malicious application in an application layer among OSI layers.

Figure 6:
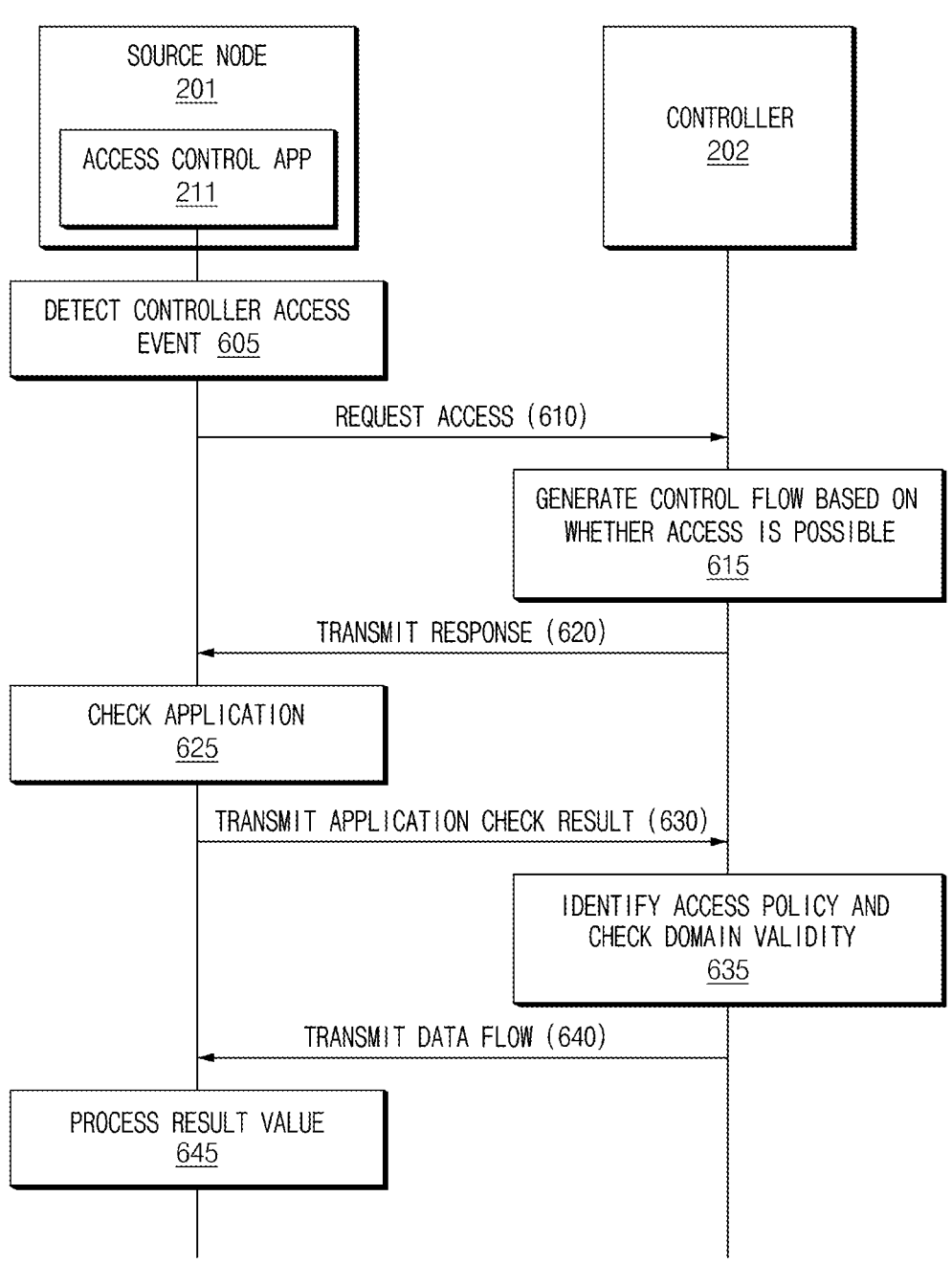
FIG. 6 illustrates a signal flow diagram for a controller access, according to various embodiments.
Figure 7:
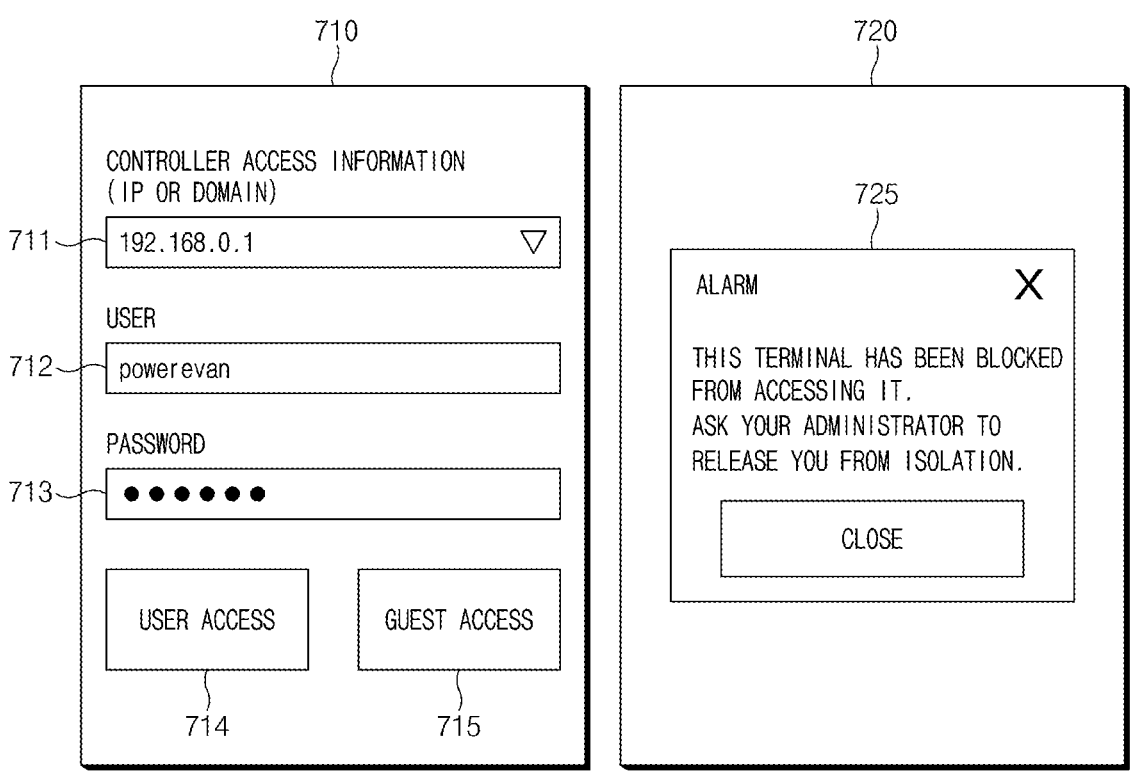
FIG. 7 illustrates a user interface screen for a controller access, according to various embodiments.

FIGS. 6 and 7 are diagrams for describing an operation for a controller access, according to various embodiments. FIG. 6 shows a signal flow diagram for a controller access, and FIG. 7 shows a user interface screen for a controller access.

Because the source node 201 need be authorized by the controller 202 to access or receive a network, the access control application 211 of the node 201 may request the controller 202 to generate a control flow such that the controller access of the node 201 is attempted. In this case, the source node 201 may be substantially the same as the source node 201 in FIG. 2. Also, the access control application 211 may be substantially the same as the access control application 211 in FIG. 2.

Referring to FIG. 6, in operation 605, the source node 201 may detect a controller access event. For example, the source node 201 may detect that the access control application 211 is installed and executed in the source node 201 and that the access to the controller 202 is requested through the access control application 211.

As an example, referring to FIG. 7, when the access control application 211 is executed, the source node 201 may display a user interface screen 710 for receiving information necessary for a controller access. The user interface screen 710 may include an input window 711 for inputting an IP or a domain of the controller 202, an input window 712 for inputting a user ID, and/or an input window 713 for inputting a password. By receiving a button 714 for a controller access of an authenticated user after information about the input windows 711 to 713 is input, the source node 201 may detect the controller access event. For another example, when the user authentication of the source node 201 is not completed yet, the source node 201 may detect the controller access event by receiving a button 715 for a controller access of an unauthorized user (i.e., a guest).

In operation 610, the source node 201 may request a controller access from the controller 202 in response to detecting the controller access event. The source node 201 may request the controller access through the access control application 211. According to an embodiment, the access control application 211 may transmit, to the controller 202, identification information (e.g., a terminal ID, an IP address, or a MAC address) of the source node 201, a type, a location, an environment, identification information of a network to which the source node 201 belongs, and/or identification information of the access control application 211.

In operation 615, the controller 202 may identify whether the access of the source node 201 is possible, in response to the received request. According to an embodiment, the controller 202 may identify whether the access of the node 201 is possible, based on a database included in a memory (e.g., the memory 330 of FIG. 3) of the controller 202. For example, the controller 202 may identify whether the access of the node 201 is possible, based on whether information received from the access control application 211 is included in an access policy database and whether identification information of the source node 201 and/or a network to which the source node 201 belongs is included in a blacklist database.

When the access of the source node 201 is possible, the controller 202 may generate a control flow between the source node 201 and the controller 202. In this case, the controller 202 may generate control flow identification information in the form of a random number and may store the identification information of the source node 201 and/or the network to which the source node 201 belongs in a control flow table. The information (e.g., control flow identification information and/or control flow information) stored in the control flow table may be used for user authentication of the source node 201, information update of the source node 201, policy identification for the network access of the source node 201, and/or validation verification.

The controller 202 may generate receivable application information based on the access policy. For example, the receivable application information may be a whitelist generated based on the access policy.

When the control flow is generated, in operation 620, the controller 202 may transmit a response to the controller access request to the source node 201. In this case, the controller 202 may transmit the generated control flow identification information to the source node 201. Also, the controller 202 may transfer the receivable application information to the access control application 211.

In operation 625, the access control application 211 of the source node 201 may check an application. For example, the access control application 211 may check the application based on service port information and receivable application information received from the controller 202. The access control application 211 may identify whether the application is present (or installed) in the source node 201 based on the receivable application information and may check the integrity and stability of the application present therein (or checking whether the application is forged or falsified, code signing, or a fingerprint), depending on a validation check policy.

In operation 630, the access control application 211 may transmit an application check result to the controller 202. For example, the access control application 211 may transmit whether a receivable application exists and the validity check result to the controller 202.

In operation 635, the controller 202 may identify whether a policy accessible before authentication of the network access for each application is present in the access policy, based on the received application check result. When an accessible policy exists, the controller 202 may generate data flow information based on the identification information of the source node 201, and the port information and the identification information of the destination node 204 and may insert domain name information into the data flow generated through the domain validity verification.

In operation 640, the controller 202 may transmit the data flow into which the domain name information is inserted, to the access control application 211.

In operation 645, the access control application 211 of the source node 201 may process a result value depending on the received response. For example, the access control application 211 may store the received control flow identification information and may display a user interface screen, which indicates that the controller access is completed, to the user. When the controller access is completed, a network access to a destination network, which is requested by the source node 201, may be controlled by the controller 202.

According to another embodiment, the controller 202 may determine that the access of the source node 201 is impossible. For example, when the identification information of the source node 201 and/or the identification information of the network to which the source node 201 belongs is included in a blacklist database, the controller 202 may determine that the access of the source node 201 is impossible. In this case, in operation 645, the controller 202 may transmit a response indicating that the controller access of the source node 201 is impossible, without generating the control flow in operation 615. Also, in this case, operation 625 to operation 640 may not be performed.

When the source node 201 receives the response indicating that the access of the source node 201 is impossible, in operation 645, the source node 201 may output a user interface screen, which indicates that the controller access is impossible, to the user. For example, referring to FIG. 7, the source node 201 may display a user interface screen 720 through the access control application 211. The user interface screen 720 may include a user interface 725 which indicates that the access of the source node 201 is blocked and guides the release of isolation through an administrator (e.g., the controller 202).

Also, when the data flow received from the controller 202 exists, the access control application 211 of the source node 201 may update the data flow of the source node 201, that is, may manage the data flow such that a data packet is capable of being transmitted based on information of a data flow previously authorized in a network access.

Figure 8:
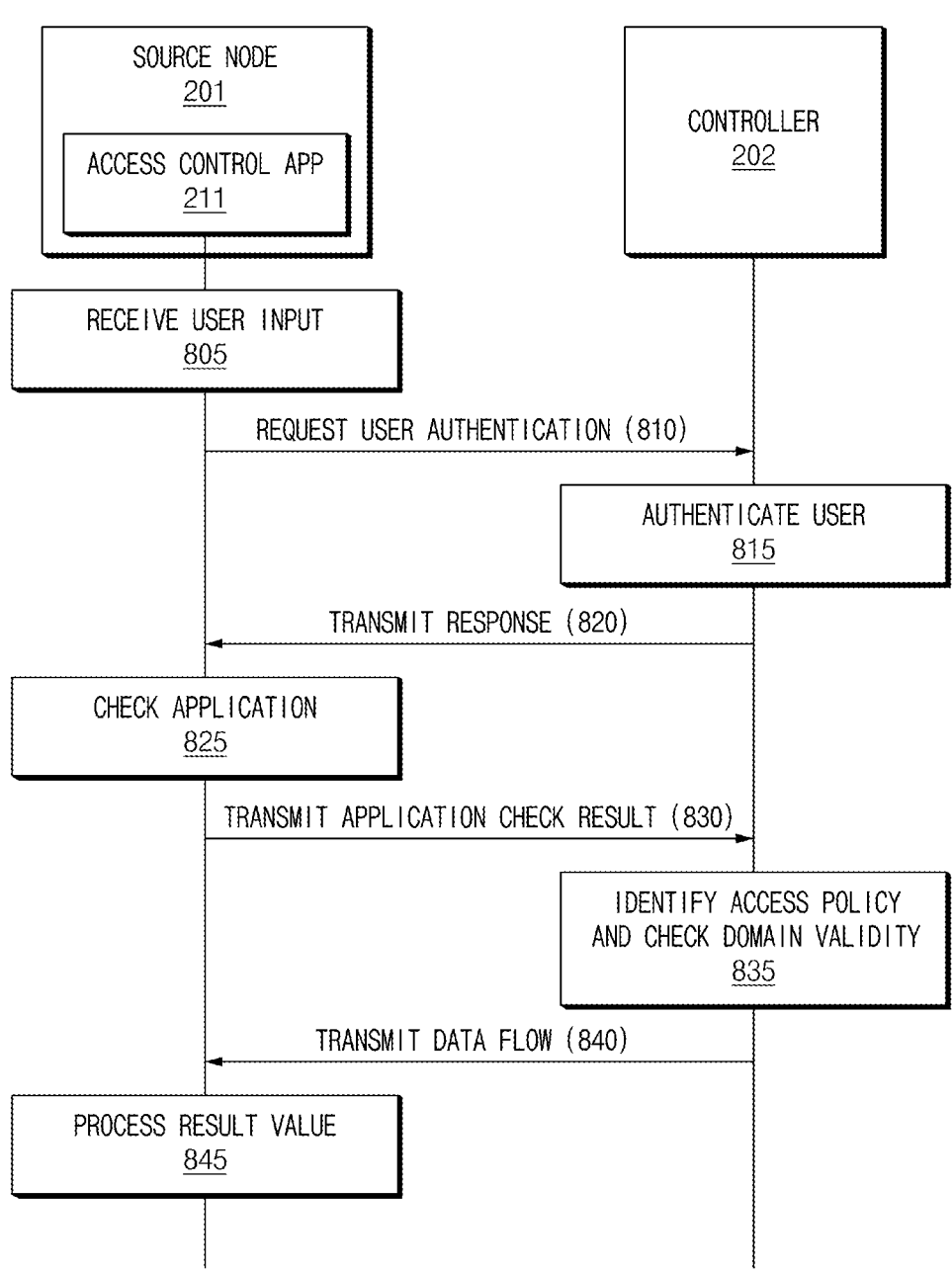
FIG. 8 illustrates a signal flow diagram for user authentication, according to various embodiments.

FIG. 8 illustrates a signal flow diagram for user authentication, according to various embodiments.

For the source node 201 (e.g., the source node 201 of FIG. 2) to obtain a detailed authority to access a destination network, the access control application 211 (e.g., the access control application 211 of FIG. 2) of the source node 201 may obtain certification for the user of the source node 201 from the controller 202.

Referring to FIG. 8, in operation 805, the source node 201 may receive an input for user authentication. The input for user authentication may be, for example, a user input for entering a user ID and a password. As another example, the input for user authentication may be a user input (e.g., biometric information) for more enhanced authentication.

In operation 810, the source node 201 may request user authentication from the controller 202. For example, the access control application 211 may transmit input information for user authentication to the controller 202. When a control flow between the source node 201 and the controller 202 is already generated, the access control application 211 may transmit the input information for user authentication together with control flow identification information.

In operation 815, the controller 202 may authenticate the user based on the information received from the source node 201. For example, the controller 202 may determine whether the user is accessible depending on an access policy and whether the user is included in a blacklist, based on a user ID, a password, and/or enhanced authentication information, which are included in the received information, and a database (e.g., the access policy database 311 or the blacklist database 314 of FIG. 3) included in a memory of the controller 202.

When the user is authenticated, the controller 202 may add identification information (e.g., a user ID) of the user to the control flow identification information. The added user identification information may be used for the authenticated user to access a controller or a network.

The controller 202 may generate receivable application information based on the access policy. For example, the receivable application information may be a whitelist generated based on the access policy.

In operation 820, the controller 202 may transmit information, which indicates that the user is authenticated, to the node 201 as a response to the user authentication request. Also, the controller 202 may transfer the receivable application information to the access control application 211.

In operation 825, the access control application 211 of the source node 201 may check an application. For example, the access control application 211 may check the application based on service port information and receivable application information received from the controller 202. The access control application 211 may identify whether the application is present (or installed) in the source node 201 based on the receivable application information and may check the integrity and stability of the application present therein (or checking whether the application is forged or falsified, code signing, or a fingerprint), depending on a validation check policy.

In operation 830, the access control application 211 may transmit an application check result to the controller 202. For example, the access control application 211 may transmit whether a receivable application exists and the validity check result to the controller 202.

In operation 835, the controller 202 may identify whether a policy accessible before authentication of the network access for each application is present in the access policy, based on the received application check result. When an accessible policy exists, the controller 202 may generate data flow information based on the identification information of the source node 201, and the port information and the identification information of the destination node 204, and may insert domain name information into the data flow generated through the domain validity verification.

In operation 840, the controller 202 may transmit the data flow into which the domain name information is inserted, to the access control application 211.

In operation 845, the access control application 211 of the source node 201 may process a result value for the user authentication. For example, the source node 201 may output a user interface screen, which indicates that the user authentication is completed, to the user through a display.

According to another embodiment, the controller 202 may determine that the user authentication is impossible. For example, when the identification information of the user is included in a blacklist database, the controller 202 may determine that the user authentication is impossible. In this case, in operation 820, the controller 202 may transmit information, which indicates that the user authentication is impossible, to the node 201. In operation 845, the source node 201 may display a user interface screen, which indicates that the user authentication is failed, through a display. In this case, operation 825 to operation 840 may not be performed.

Also, when the data flow received from the controller 202 exists, the access control application 211 of the source node 201 may update the data flow of the source node 201, that is, may manage the data flow such that a data packet is capable of being transmitted based on information of a data flow previously authorized in a network access.

Figure 9:
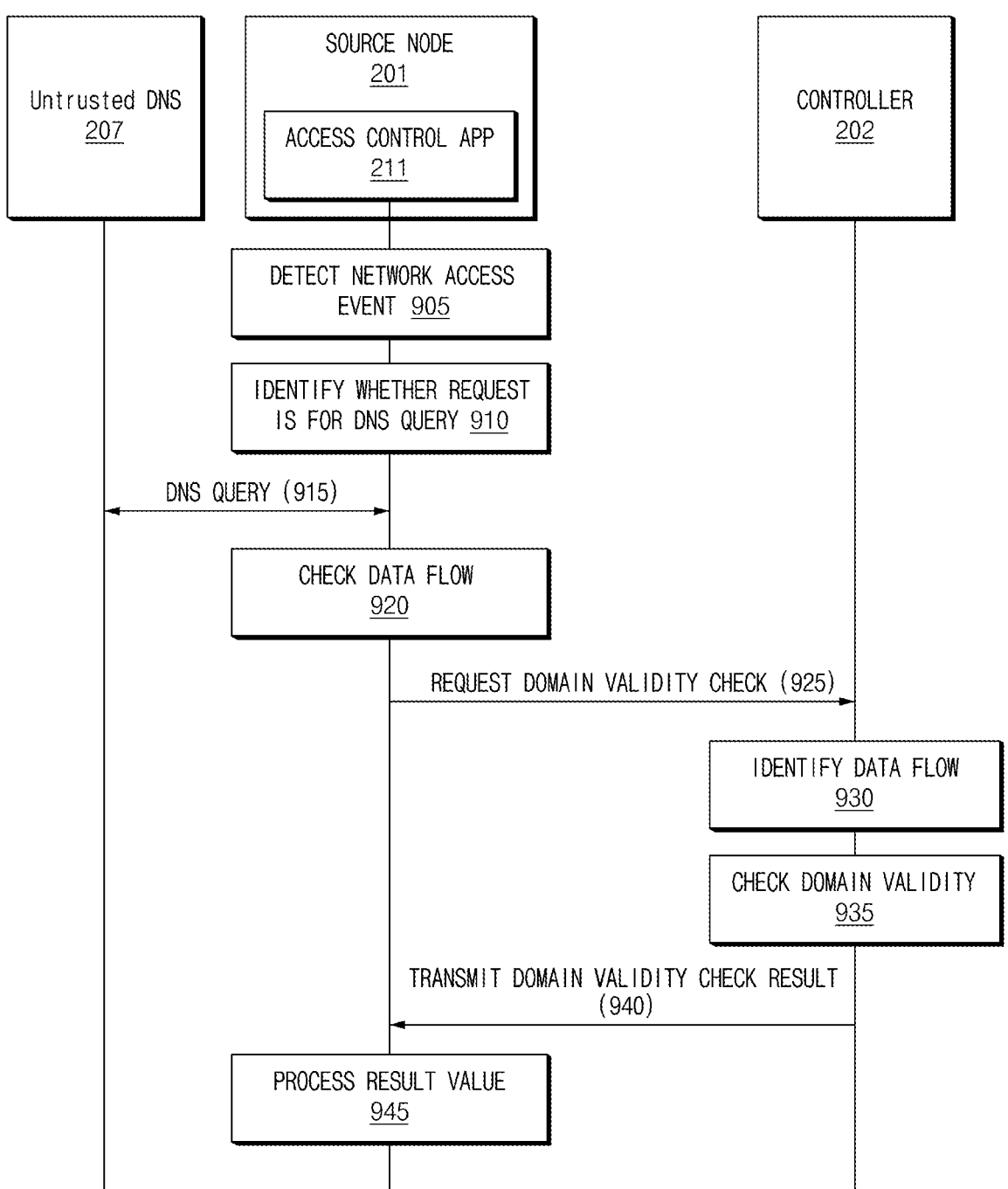
FIG. 9 illustrates a signal flow diagram for DNS query, according to various embodiments.

FIG. 9 illustrates a signal flow diagram for DNS query, according to various embodiments.

When a DNS query request data packet is detected, the source node 201 may stably control a network access based on a domain name, by querying an external DNS server and the controller 202.

In operation 905, the access control application 211 of the source node 201 may detect a network access event. For example, the access control application 211 may detect that a target application such as a web browser attempts to access a destination network including the destination node 204, such as the Internet. For example, the user may execute the web browser and may input and call a web address to be accessed. For another example, the access control application 211 may detect that the DNS query data packet of the target application attempts an access.

In an embodiment, the access control application 211 may identify whether a data flow corresponding to identification information of the target application requesting the access, and port information and identification information of the destination network exists. For example, when the data flow exists but is invalid, the access control application 211 may drop a data packet. As another example, when the data flow exists, the access control application 211 may transmit the data packet.

In operation 910, the access control application 211 may identify whether the network access request is a request for a DNS query. For example, the access control application 211 may identify whether the network access request is a request for a DNS query, based on whether a data packet includes a destination port for the DNS query or whether a data packet is a packet for the DNS query. According to an embodiment, when the network access request is not the request for the DNS query, the access control application 211 may perform operation 1015 of FIG. 10.

When the network access request is the request for the DNS query, in operation 915, the access control application 211 may transmit the DNS query request packet. For example, the access control application 211 may transmit the DNS query request packet to an untrusted DNS 207 and may receive a result value of the query request from the untrusted DNS 207. For another example, the result value of the query request may be parsed in compliance with the DNS query result standard and may include IP information and supplementary information in the domain name. As another example, the untrusted DNS 207 may include an external server or a DNS server. The access control application 211 may store the extracted domain name and IP information in a DNS table (e.g., the DNS table 318 of FIG. 3) in a one-to-one correspondence.

In operation 920, the access control application 211 may identify whether a data flow corresponding to the DNS query-requested IP information exists. Also, the access control application 211 may identify whether there is a need to check domain validity for the corresponding data flow.

When the data flow exists and there is a need to check the domain validity, in operation 925, the access control application 211 may request the controller 202 to check the domain validity. For example, the domain validity check request may include at least one of data flow identification information, domain information, identification information of a target application, destination network identification information, and destination port information.

In operation 930, the controller 202 may identify whether a valid data flow corresponding to the received identification information exists. For example, the controller 202 may identify whether there is a data flow corresponding to the data flow identification information, the domain information, the identification information of the target application, the destination network identification information, and the destination port information. According to an embodiment, when the data flow does not exist, the controller 202 may transmit validation check failure information to the access control application 211 of the source node 201 and may provide notification that the network access is impossible (operation 940).

When the data flow exists, in operation 935, the controller 202 may check the domain validity. For example, based on the destination network identification information, the destination port information, and the domain information, the controller 202 may check whether the domain information is valid and whether the domain information is included in a harmful site. According to an embodiment, when the domain validity check is failed, the controller 202 may transmit domain validity check failure information to the access control application 211 and may provide notification that the network access is impossible (operation 940). According to another embodiment, when the domain validity check is successful, the controller 202 may add the domain information to the data flow, may update the data flow by changing domain status information included in the data flow to a domain validity check completion state, and may transmit the updated data flow to the access control application 211 of the source node 201 (operation 940). In an embodiment, the domain validity check operation (i.e., operation 935) may be performed through operation 1105 to operation 1135 illustrated in FIG. 11.

In operation 945, the access control application 211 of the source node 201 may process a result value of the domain validity check. For example, when the access control application 211 receives the validity check failure information and the network access-impossible information from the controller 202, the access control application 211 may change a data flow state to a transmission-impossible state and may block a data packet to be transmitted to the corresponding network. For another example, when validity check success information is received from the controller 202, the access control application 211 may permit the transmission of a data packet to the corresponding network based on the updated data flow.

Figure 10:
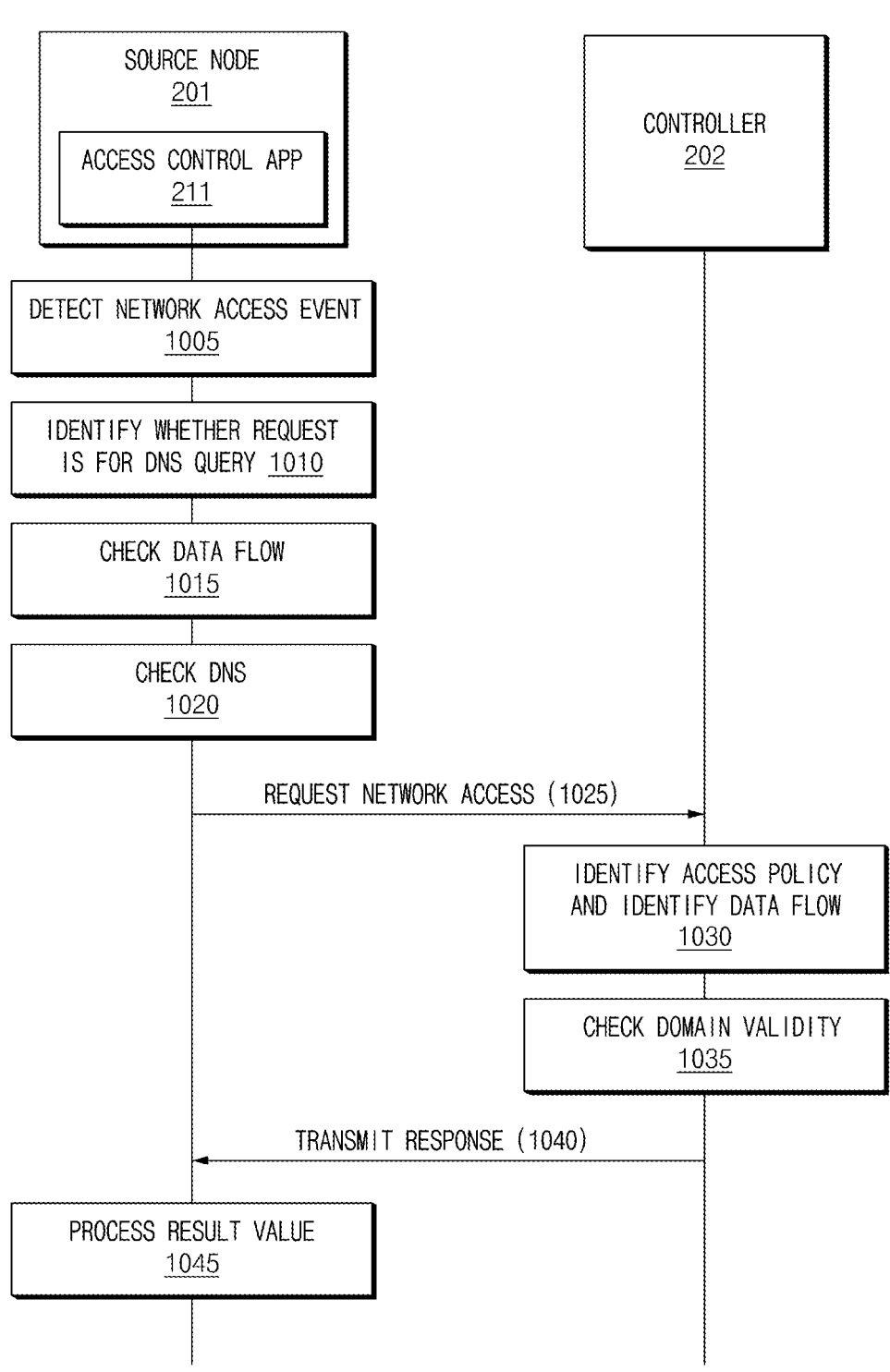
FIG. 10 illustrates a signal flow diagram for accessing a network, according to various embodiments.

FIG. 10 illustrates a signal flow diagram for a network access, according to various embodiments.

After the source node 201 is authorized from the controller 202, the source node 201 may control the network access of any other applications stored in the source node 201 through the access control application 211 of the source node 201, and thus, trusted data transmission may be guaranteed.

In operation 1005, the access control application 211 of the source node 201 may detect a network access event. For example, the access control application 211 may detect that a target application such as a web browser attempts to access a destination network including the destination node 204, such as the Internet. For example, the user may execute the web browser and may input and call a web address to be accessed.

In operation 1010, the access control application 211 may identify whether the network access request is a DNS query request. For example, when the network access request is the DNS query request, the access control application 211 may perform operation 915 to operation 945 of FIG. 9. For another example, when the network access request is not the DNS query request, the access control application 211 may perform operation 1015.

When the access control application 211 needs to communicate with a destination network, in operation 1015, the access control application 211 may identify whether there is a data flow corresponding to identification information of an application requesting the access to communicate with the destination network, and port information and identification information of the destination network. For example, when the data flow exists but is invalid (e.g., in a data packet transmission-impossible state), the access control application 211 may drop a data packet of the target application. As another example, when the data flow exists, the data packet of the target application may be transmitted.

Although not illustrated in FIG. 10, when the data flow does not exist and when the update of the data flow is required, such as when the update of the data flow is required due to the expiration of an authentication time of the data flow, the access control application 211 may further perform a validity check depending on a validity check policy. For example, the validity check may check whether the target application is of integrity and stability (e.g., checking whether an application is forged or falsified, code signing, a fingerprint, or the like).

In operation 1020, the access control application 211 may check a DNS of the data packet. For example, the access control application 211 may identify whether domain information corresponding to the identification information of the destination network is present in a DNS table (e.g., the DNS table 318 of FIG. 3). According to an embodiment, when the domain information corresponding to the identification information of the destination network is absent from the DNS table, whether the domain information corresponding to the identification information of the destination network is present in a DNS table provided by an operating system may be identified through an IP-based DNS reverse query function provided by the operating system.

In operation 1025, the access control application 211 may transmit, to the controller 202, control flow identification information, target application identification information, port information and identification information of the destination network, and domain information identified through the DNS check and may request the network access. For another example, when the domain information identified through the DNS check does not exist, the access control application 211 may transmit the remaining information other than the domain information to the controller 202 and may request the network access.

In operation 1030, the controller 202 may identify whether the access is possible, by identifying whether information included in the network access request is included in an access policy corresponding to information identified based on the received control flow identification information. Also, the controller 202 may identify whether the access to the destination network corresponding to the received identification information is possible. According to an embodiment, when it is determined that the access is impossible, the controller 202 may transmit an access-impossible result to the access control application (operation 1040).

The controller 202 may identify whether there is a valid data flow corresponding to the identification information received from the access control application 211. According to an embodiment, when the data flow exists but the access is impossible, the controller 202 may transmit an access-impossible result to the access control application 211 (operation 1040). According to another embodiment, when the data flow exists and the domain information received in the access request and the domain information included in the data flow are different, the controller 202 may transmit an access-impossible result to the access control application 211 (operation 1040).

In operation 1035, based on the destination network identification information, the destination port information, and the domain information, the controller 202 may check whether the domain information is valid and whether the domain information is included in a harmful site. When the domain validity check is failed, the controller 202 may transmit validity check failure information to the access control application 211 (operation 1040). For another example, when the validity check is successful, the controller 202 may generate the data flow, may add the generated data flow to a data flow table (e.g., the data flow table 317 of FIG. 3), and may transmit the generated data flow to the access control application 211 (operation 1040). According to an embodiment, the domain information may be included in the generated data flow. In an embodiment, the domain validity check may be performed through operations illustrated in FIG. 11.

In operation 1045, the access control application 211 may process a result value of the domain validity check received from the controller 202. For example, when the access control application 211 receives a result indicating that the network access is impossible, the access control application 211 may drop the data packet. For another example, when the generated data flow is received from the controller 202, the access control application 211 may add the data flow and may transmit a data packet based on the received data flow.

Figure 11:
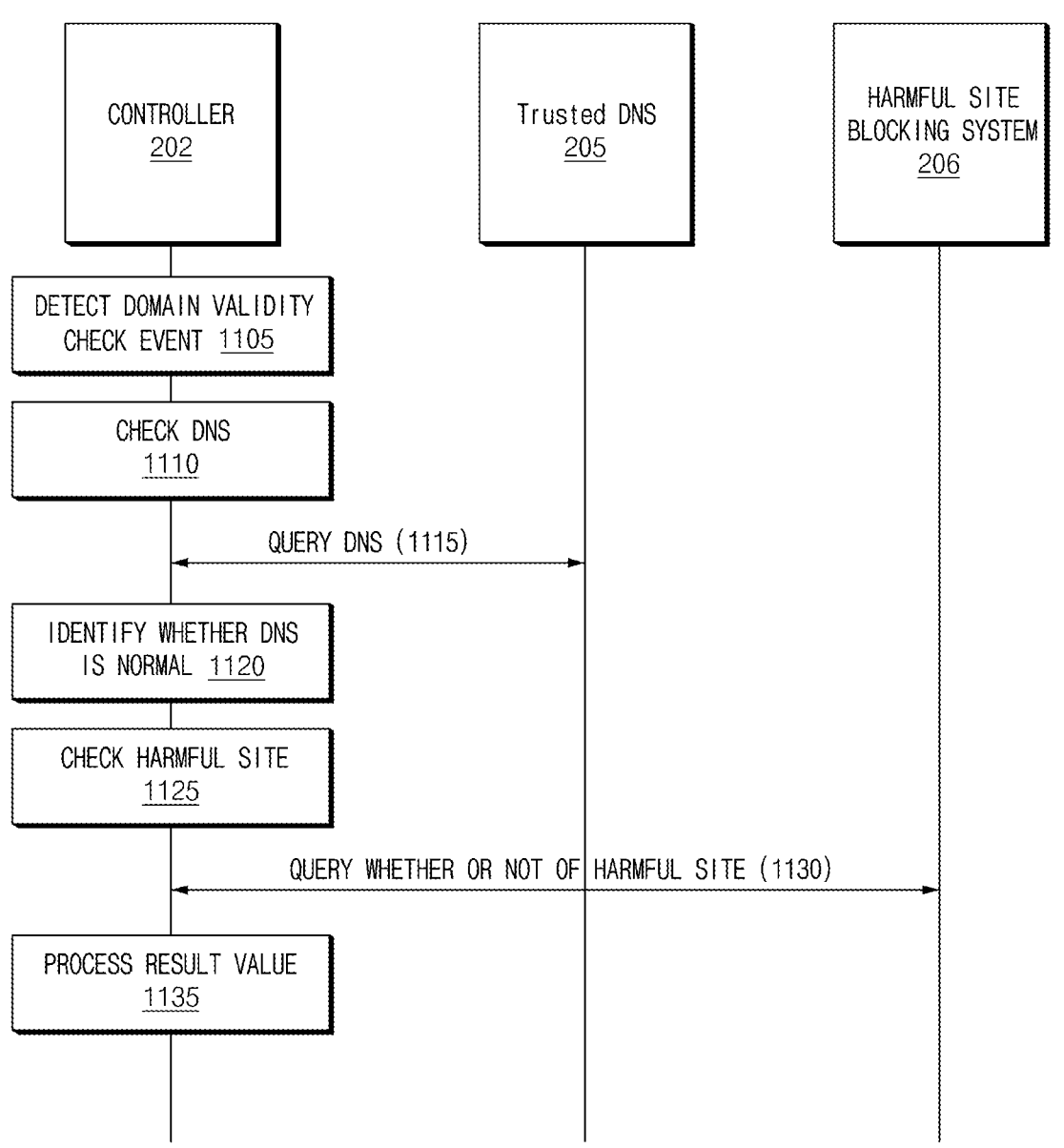
FIG. 11 illustrates a signal flow diagram for checking domain validity, according to various embodiments.

FIG. 11 illustrates a signal flow diagram for checking domain validity, according to various embodiments.

By checking domain validity, the controller 202 may identify whether a DNS is normal and may prevent the access to a harmful site, and thus, the controller 202 may control the network access such that the network access is performed in a stable environment.

In operation 1105, the controller 202 may detect a domain validity check event. For example, the controller 202 may detect the domain validity check event through operation 935 of FIG. 9 or operation 1035 of FIG. 10. According to an embodiment, the controller 202 may detect the domain validity check event through operation 635 of FIG. 6 or operation 835 of FIG. 8.

In operation 1110, the controller 202 may check the DNS. For example, when information corresponding to the domain validity check request is IP information, the controller 202 may extract domain information corresponding to the IP information from a DNS table (e.g., the DNS table 318 of FIG. 3). For another example, when the domain information corresponding to the IP information is absent from the DNS table, because there is a need to identify a domain name through a protection network or terminal, the controller 202 may perform access success processing. For another example, when the domain information corresponding to the IP information is present in the DNS table, the controller 202 may perform operation 1120. For another example, when the check-requested information is domain information, the controller 202 may extract IP information corresponding to a domain name from the DNS table. For another example, when the IP information corresponding to the domain name exists, the controller 202 may perform operation 1120.

When the domain information is absent from the DNS table, in operation 1115, the controller 202 may query a trusted DNS (e.g., the trusted DNS 205) included in an access policy based on the domain information and may receive a query result. For example, the query result may include an IP list and supplementary information, and the controller 202 may update the query result to the DNS table.

In operation 1120, the controller 202 may identify whether the DNS is normal. For example, the controller 202 may compare the identified domain information with the access-requested IP information. When an access-requested IP corresponding to the domain information does not exist, the controller 202 may determine that DNS pharming occurs and may perform access failure processing. For another example, when an access-requested IP corresponding to the domain information exists, the controller 202 may add and process the domain information in response to access success processing (operation 1135). According to an embodiment, the controller 202 may add the domain information to the data flow (operation 1135).

In operation 1125, based on the access-requested IP and the domain information, the controller 202 may identify whether the corresponding IP and the corresponding domain information are present in a harmful site table (e.g., the harmful site table 319 of FIG. 3). For example, when the access-requested IP and the domain information are included in the harmful site table, the controller 202 may perform access failure processing. For another example, when the access-requested IP and the domain information are not included in the harmful site table, the controller 202 may determine whether to perform operation 1130. When it is determined that there is no need to query whether it is a harmful site (i.e., to perform operation 1130), the controller 202 may perform access success processing (operation 1135). According to an embodiment, the harmful site table may include one or more tables which are applicable depending on an identified user, an identified network, a terminal, a harmful site classification criterion, a risk level, and the like, and the controller 202 may search a table set depending on an access policy and may determine whether it is a harmful site.

When it is determined that there is a need to query whether it is a harmful site, in operation S1130, the controller 202 may transmit the access-requested IP and the domain information to an external server (e.g., the harmful site blocking system 206) and may query whether it is a harmful site. The controller 202 may receive a response to the query about whether it is a harmful site, may perform access success processing when the access-requested IP and the domain information are not included in a harmful site, and may perform access failure processing when the access-requested IP and the domain information are included in a harmful site (operation 1135).

Figure 12:
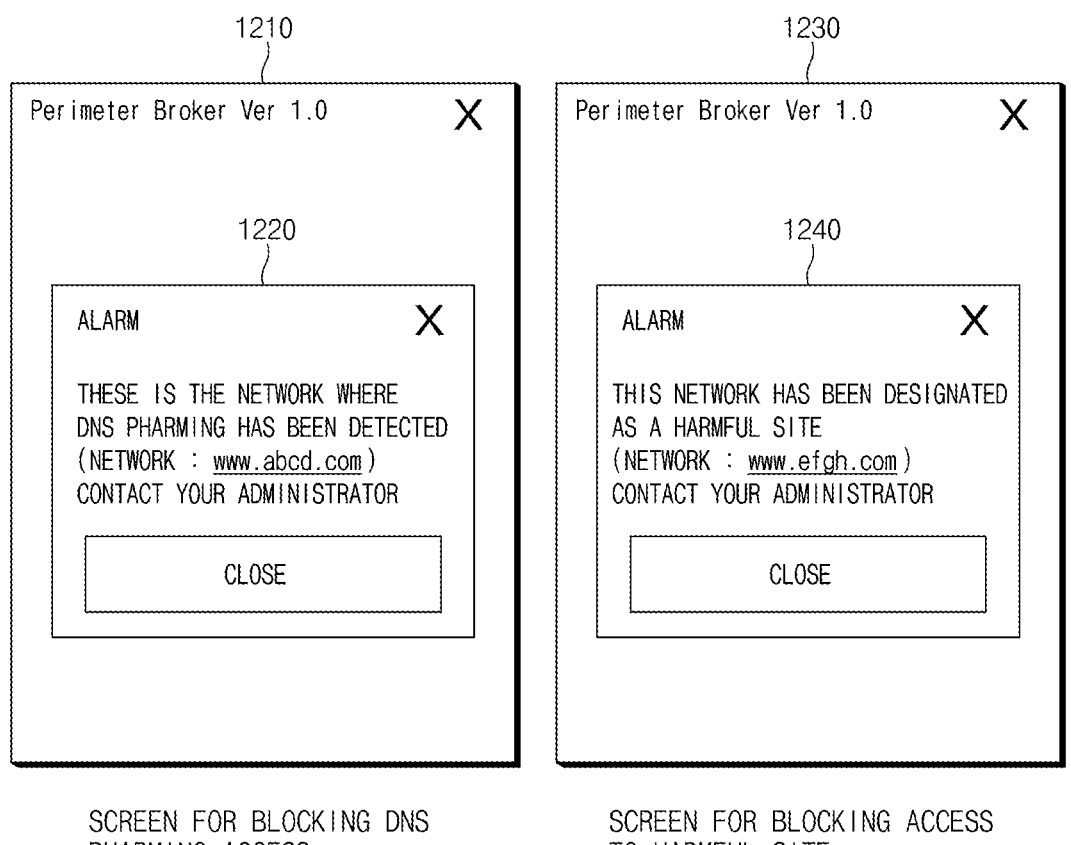
FIG. 12 illustrates a user interface screen determined as DNS pharming or a harmful site, according to various embodiments.

FIG. 12 illustrates a user interface screen determined as DNS pharming or a harmful site, according to various embodiments.

Referring to FIG. 12, when a DNS check result indicates a failure, the source node 201 may provide the user with an interface displaying information 1220, which indicates that DNS pharming is detected, in a user interface screen 1210.

Also, when the access to a harmful site is determined, the source node 201 may provide the user with an interface displaying information 1240, which indicates that a network is designated as a harmful site, in a user interface screen 1230.

FIG. 13 is a flowchart illustrating operations for querying a DNS in a network access on a node, according to various embodiments. Operations illustrated in FIG. 13 may be performed by the access control application 211 of the source node 201 illustrated in FIG. 2.

Referring to FIG. 13, the access control application 211 may detect a network access event (operation 1305).

In operation 1310, the access control application 211 may identify whether a data packet is a DNS query request packet. For example, when a data packet of a target application is a DNS query request packet, the access control application 211 may perform operation 1315. For another example, when the data packet is not the DNS query request packet, the access control application 211 may perform a normal network access control.

In operation 1315, the access control application 211 may transmit the DNS query request packet to a first external server. For example, the first external server may be the untrusted DNS 207 illustrated in FIG. 9.

In operation 1320, the access control application 211 may receive a DNS query result from the first external server. For example, the DNS query result may include domain information and IP information.

In operation 1325, the access control application 211 may identify whether a data packet corresponding to the IP information exists. Also, when the data flow exists, the access control application 211 may identify whether a domain validity check is required. For example, the access control application 211 may determine whether to request the domain validity check from a controller (e.g., the controller 202 of FIG. 2), by identifying information indicating whether there is a need to check the validity of a domain included in a data flow.

In operation 1330, the access control application 211 may request the domain validity check from a second external server (e.g., the controller 202 of FIG. 2). For example, the domain validity check request may include identification information of the data flow, domain information, and IP information. According to an embodiment, the domain validity check request may further include port information.

According to another embodiment, the domain validity check request may be executed by the controller 202 of FIG. 2 through the operations illustrated in FIG. 11.

In operation 1335, the access control application 211 may receive a domain validity check result from the second external server (e.g., the controller 202 of FIG. 2). For example, the domain validity check result may include a data flow whose domain validity check state is updated. For another example, when the access control application 211 receives a domain validity check success result, the access control application 211 may transmit the data packet to the target application based on the data flow whose check state is updated. For another example, when a domain validity check failure result is received, the access control application 211 may drop the data packet of the target application and may inform the user of an access-impossible result.

The above description is merely an illustrative explanation of the technical idea disclosed in the present disclosure, but may be variously modified and altered by those skilled in the art to which the present disclosure pertains without departing from the spirit and scope of the present disclosure claimed in the following claims.

Therefore, the embodiments of the present disclosure are provided to explain the spirit and scope of the present disclosure, but not to limit them, so that the spirit and scope of the present disclosure is not limited by the embodiments. The scope of protection of the technical idea disclosed in the present disclosure should be interpreted in accordance with the claims below, and all the technical ideas within the scope equivalent to the claims should be included in the scope of the present disclosure.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A node, comprising:

a communication circuit;

a processor operatively connected to the communication circuit; and a memory operatively connected to the processor and configured to store a database, a target application, and an access control application, wherein the memory stores instructions causing, when executed by the processor, the node to:

detect a network access event through the access control application;

transmit a domain name system (DNS) query request packet to a first external server through the access control application;

receive a DNS query result from the first external server, wherein the DNS query result includes domain information and IP information; and perform a domain validity check request or a network access request including the domain information to a second external server based on whether there exists a data flow corresponding to the IP information, through the access control application, and when there exists the data flow corresponding to the IP information through the access control application:

perform the domain validity check request to the second external server, where the domain validity check request includes the data flow identification information and the domain information; and receive a domain validity check result including a data flow whose domain validity check state is updated, from the second external server through the access control application.

2. The node of claim 1, wherein the instructions cause the node to:

identify whether a data flow corresponding to identification information of a destination network of the data packet, port information, and identification information of the target application and authorized from the second external server exists, through the access control application;

when the authorized data flow exists, transmit the data packet;

when the authorized data flow does not exist, identify whether domain information corresponding to the identification information of the destination network exists;

request a network access from the second external server through the access control application, wherein the network access request includes the identification information of the target application, the identification information of the destination network, and the port information; and receive a data flow generated from the second external server through the access control application.

3. The node of claim 2, wherein, when domain information corresponding the identification information of the destination network exists, the network access request includes the domain information.

4. The node of claim 2, wherein the instructions cause the node to:

identify whether domain information corresponding to the identification information of the destination network is present in the database, through the access control application; and identify existence of the domain information through a DNS reverse query function based on the identification information of the destination network of an operating system, through the access control application.

5. The node of claim 1, wherein the instructions cause the node to:

request a controller access from the second external server through the access control application;

receive a first response to the controller access request from the second external server through the access control application, wherein the first response includes an accessible application list and identification information of a control flow generated between the access control application and the second external server;

check the target application based on the application list, through the access control application;

transmit the target application check result to the external server, through the access control application; and receive a data flow into which the domain information is inserted from the external server, through the access control application.

6. The node of claim 1, wherein the instructions cause the node to:

request a user authentication from the second external server through the access control application;

receive a second response to the user authentication request from the second external server through the access control application, wherein the second response includes an accessible application list and identification information of a control flow generated between the access control application and the second external server;

check the target application based on the application list, through the access control application;

transmit the target application check result to the external server, through the access control application; and receive a data flow into which the domain information is inserted from the external server, through the access control application.

7. The node of claim 1, wherein the instructions cause the node to:

identify whether the network access event is a request for a DNS query, through the access control application;

when the network access event is the request for the DNS query, transmit the DNS query request packet to the first external server through the access control application; and when the network access event is not the request for the DNS query, request a network access from the second external server through the access control application.

8. The node of claim 1, wherein the instructions cause the node to:

identify whether there is a need to check domain validity of the data flow through the access control application;

when there is a need to check the domain validity, request the second external server to check the domain validity; and when there is no need to check the domain validity, transmit a data packet based on the data flow.

9. A server, comprising:

a communication circuit;

a memory configured to store a database; and a processor operatively connected to the communication circuit and the memory, wherein the processor is configured to:

receive a network access request for a destination network of a target application from an access control application of a node;

identify whether an access of the target application is possible, based on identification information and domain information of the target application, and identification information and a port of the destination network;

identify whether there exists a data flow corresponding to the identification information of the target application, the identification information of the destination network, a port, and the domain information;

perform a domain validity check based on the identification information of the destination network, a port, and the domain information;

transmit whether a network access is possible to the access control application based on whether the data flow exists and a result of the domain validity check;

when the domain validity check is failed, transmit validity check failure information to the access control application; and when the domain validity check is successful, generate a data flow and transmit the generated data flow to the access control application.

10. The server of claim 9, wherein the processor is configured to:

when the domain information and domain information included in the data flow are different, transmit a network access-impossible result to the access control application.

11. The server of claim 9, wherein, when the domain validity check is performed based on the domain information, the processor is configured to:

identify whether the domain information is present in the database;

when the domain information is absent from the database, query a third external server based on the domain information and update a result of the query to the database; and compare whether the domain information is matched with the identification information of the destination network and perform access success processing based on a comparison result.

12. The server of claim 11, wherein the processor is configured to:

determine whether or not of a harmful site based on the domain information, the identification information of the destination network, and the database, or query whether or not of the harmful site to a fourth external server based on the domain information and the identification information of the destination network and receive a response to the query of whether or not of the harmful site; and perform access success processing based on the response to the query or whether or not of the harmful site thus determined.

13. The server of claim 9, wherein, when the domain validity check is performed based on the destination network domain information, the processor is configured to:

identify whether the destination network identification information is present in the database;

when the destination network identification information is present in the database, compare whether the domain information and the destination network identification information are matched; and when the destination network identification information is absent from the database, perform access success processing.

14. An operating method of an access control application stored in a node, the method comprising:

detecting a network access event;

identifying whether a data packet of a target application is a DNS query request packet;

transmitting the DNS query request packet to a first external server;

receiving a DNS query result from the first external server, wherein the DNS query result includes domain information and IP information;

identifying whether a data flow corresponding to the IP information exists and whether there is a need to check domain validity of the data flow;

requesting a domain validity check from a second external server, wherein the domain validity check request includes identification information of the data flow, the domain information, and the IP information; and receiving a domain validity check result including a data flow whose a domain validity check state is updated from the second external server.

* * * * *